(12) United States Patent
Zhu et al.

(10) Patent No.: US 10,405,707 B2
(45) Date of Patent: Sep. 10, 2019

(54) BLOWER

(71) Applicant: Nanjing Chervon Industry Co., Ltd., Nanjing (CN)

(72) Inventors: Qipeng Zhu, Nanjing (CN); Xiangqing Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 119 days.

(21) Appl. No.: 15/802,139

(22) Filed: Nov. 2, 2017

(65) Prior Publication Data

US 2018/0140146 A1    May 24, 2018

(30) Foreign Application Priority Data

Nov. 7, 2016  (CN) .......................... 2016 1 0976734
Apr. 19, 2017  (CN) .......................... 2017 1 0257324

(51) Int. Cl.

| | |
|---|---|
| A47L 5/14 | (2006.01) |
| A01G 20/47 | (2018.01) |
| F04D 19/00 | (2006.01) |
| F04D 25/06 | (2006.01) |
| F04D 29/38 | (2006.01) |
| F04D 25/08 | (2006.01) |
| F04D 29/54 | (2006.01) |

(52) U.S. Cl.
CPC ................ *A47L 5/14* (2013.01); *A01G 20/47* (2018.02); *F04D 19/002* (2013.01); *F04D 25/0673* (2013.01); *F04D 25/084* (2013.01); *F04D 29/384* (2013.01); *F04D 29/545* (2013.01)

(58) Field of Classification Search
CPC ......... A47L 5/14; A01G 20/47; F04D 29/384; F04D 25/0673; F04D 25/084; F04D 19/002; F04D 29/545; F04D 19/00
IPC ............. A47L 5/14; A01G 20/47; F04D 19/00
See application file for complete search history.

(56) References Cited

U.S. PATENT DOCUMENTS

| | | | | |
|---|---|---|---|---|
| 5,197,854 | A * | 3/1993 | Jordan | F04D 19/002 415/119 |
| 9,062,681 | B2 * | 6/2015 | Lee | F04D 29/327 |
| 2008/0152487 | A1 * | 6/2008 | Shaffer | F04D 25/084 415/208.1 |
| 2012/0093655 | A1 * | 4/2012 | Yu | F01D 5/141 416/223 R |
| 2014/0234130 | A1 * | 8/2014 | Yamaoka | A47L 5/24 417/234 |

* cited by examiner

*Primary Examiner* — David Redding
(74) *Attorney, Agent, or Firm* — Greenberg Traurig, LLP

(57) ABSTRACT

A blower includes an axial fan for generating airflow. The axial fan includes a center hub capable of rotating around a central axis and several blades extended outward from the center hub in a radial direction and arranged around the central axis. The several blades and the center hub are integrated as a whole. Each blade is provided with a suction surface and a pressure surface for generating airflow. Two opposite ends of the suction surface and a pressure surface are intersected to form a front edge and a rear edge, and the front edge is in the front of the rear edge in a rotation direction of the axial fan. The front edge has a point close to the center hub which is defined as a root point, and the front edge has another point far from to the center hub which is defined as a tip point.

20 Claims, 11 Drawing Sheets

BLOWER

RELATED APPLICATION INFORMATION

This application claims the benefit under 35 U.S.C. § 119(a) of Chinese Patent Application No. CN 201610976734.2, filed on Nov. 7, 2016, and Chinese Patent Application No. CN 201710257324.7, filed on Apr. 19, 2017, each of which is incorporated herein by reference in its entirety.

FIELD OF THE DISCLOSURE

The present disclosure relates generally to a blower.

BACKGROUND OF THE DISCLOSURE

Blowers are a kind of commonly used garden tool, which can clean fallen leaves in the garden by using airflow. Currently known blowers can be divided into a centrifugal type and an axial type. The axial type blower can generate greater air volume so that it is more suitable for a user's requirements.

The blower generates airflow through an air channel and a fan disposed in the air channel. In order to reach better blowing effect, it is best to design the air channel as a straight type.

For the currently known blowers, in order to improve the power and the using time, the blowers usually use a larger battery pack. The air channel is often bent in order to mount the battery pack and the handle.

The currently known blowers have higher power consumption while realizing larger air volume, and the run time of the blower is reduced.

The statements in this section merely provide background information related to the present disclosure and may not constitute prior art.

SUMMARY

In one aspect of the disclosure, a blower is provided. The blower includes an axial fan for generating airflow. The axial fan includes a center hub that is capable of rotating around a central axis and several blades extended outward from the center hub in a radial direction and arranged around the central axis. The several blades and the center hub are integrated as a whole. Each blade is provided with a suction surface and a pressure surface for generating airflow. Two opposite ends of the suction surface and a pressure surface are intersected to form a front edge and a rear edge, and the front edge is in the front of the rear edge in a rotation direction of the axial fan. The front edge has a point close to the center hub which is defined as a root point, and the front edge has another point far from to the center hub which is defined as a tip point. A line passing the root point and intersecting vertically with the central axis is defined as an axis Y, the central axis is defined as an axis Z, and a line intersecting vertically with the axis Y and the axis Z is defined as an axis X. A projection of the front edge in a plane constituted by the axis X and the axis Y is extended outward in a radial direction of the central axis and extended forward in the rotation direction of the axial fan. A projection of the front edge in a plane constituted by the axis Z and the axis Y is extended outward in a radial direction of the central axis and extended toward a side of the axial fan from which the air is entered. An angle between a tangent line of a projection of the front edge in the plane constituted by the axis X and the axis Y at the tip point and the axis Y is greater than or equal to 5° and less than or equal to 15°. An angle between a tangent line of a projection of the front edge in the plane constituted by the axis Z and the axis Y at the tip point and the axis Y is greater than or equal to 15° and less than or equal to 25°.

Further areas of applicability will become apparent from the description provided herein. It should be understood that the description and specific examples are intended for purposes of illustration only and are not intended to limit the scope of the present disclosure.

Figure 1:
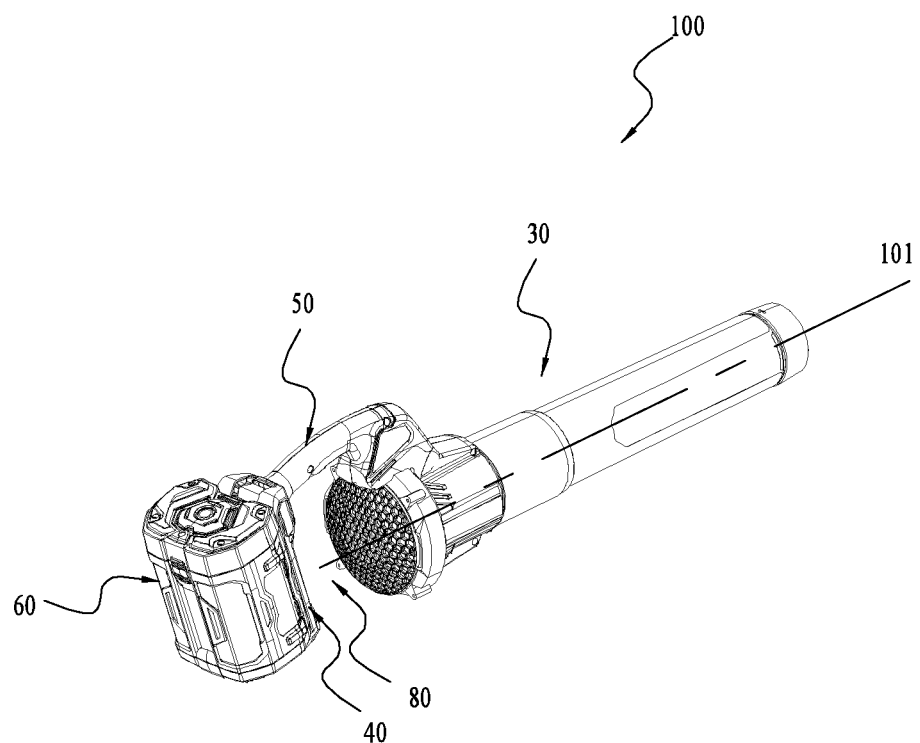
FIG. 1 is a schematic view of an exemplary blower.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention hereinafter claimed, its application, or uses.

Figure 2:
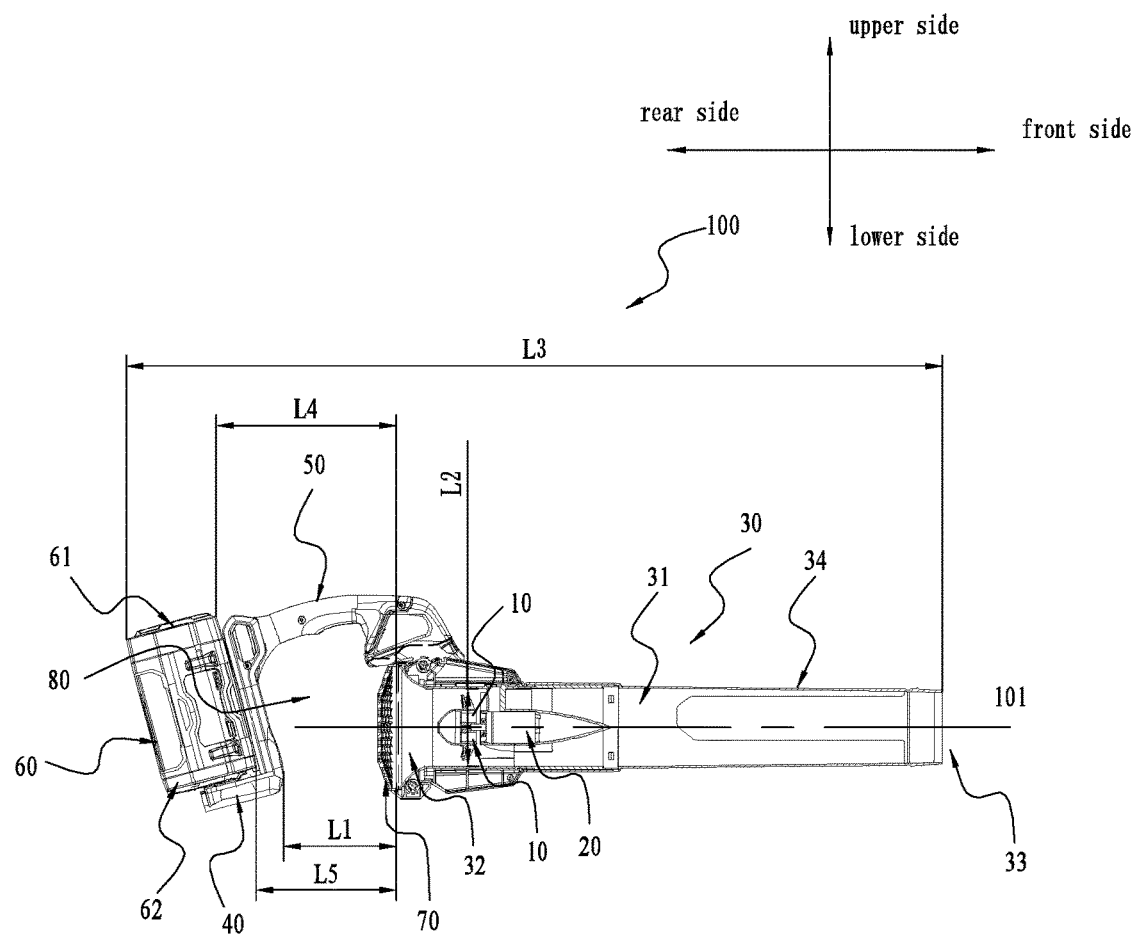
FIG. 2 a sectional view of a part of the blower in FIG. 1.

Referring to FIGS. 1-2, a blower includes a fan 10, a motor 20, an air channel portion 30, a coupling portion 40 and a handle 50.

The fan 10 is driven by the motor 20 to rotate about a central axis 101.

The air channel portion 30 is formed with an air channel 31 for guiding an airflow generated by the fan 10. As a specific embodiment, the air channel 31 is extended along the central axis 101. Alternatively, the air channel 31 can be curved. Further alternatively, the air channel portion 30 includes a flexible tube. The air channel 31 is formed with an air inlet 32 and an air outlet 33 on its two ends. The air inlet 32 allows the airflow to flow into the air channel 31, and the air outlet 33 allows the airflow to flow out of the air channel 31. The fan 10 can be rotated so as to push the airflow to enter the air channel 31 from the air inlet 32 and flow out of the air channel 31 from the air outlet 33. The fan 10 is located between the air inlet 32 and the air outlet 33. Further, the motor 20 is located in the air channel 31 and between the air inlet 32 and the air outlet 33.

The coupling portion 40 is configured to mount a battery pack 60. When the battery pack 60 is coupled with the coupling portion 40, it can supply power to the motor 20.

The handle 50 is used for a user to grip and operate the blower 100. The air channel portion 30 and the coupling portion 40 are connected with each other through the handle 50.

The air inlet 32 is located between the air outlet 33 and the coupling portion 40 and also between the coupling portion 40 and the fan 10.

The coupling portion 40, the air channel portion 30 and the handle 50 are so arranged that an open space is formed at the air inlet 32, which facilitates the airflow to enter the air inlet 32. So, the coupling portion 40, the air channel portion 30 and the handle 50 constitute an air intake space 80 which is open in a radial direction of the central axis 101. Thus, the air can enter the air intake space 80 along the radial direction of the central axis 101. The air intake space 80 is connected with the air inlet 32, so that the airflow can enter the air channel 31 from the air inlet 32. The air intake space 80 is so arranged that the inlet airflow resistance can be decreased and the efficiency of the blower is improved. The handle 50 is located on the outside of the air inlet 32 in the radial direction of the central axis 101. Or it can be said that a projection of the handle 50 in a plane substantially perpendicular to the central axis 101 is located on the outside of a projection of the air inlet 32 on the plane. It can avoid the handle 50 being disposed within the projection of the air inlet 32 to decrease the inlet airflow. The arrangement of the handle 50 also can avoid decreasing the space which is corresponded with the air inlet 32 so as to affect the inlet air.

The blower 100 further includes a shield 70. The shield 70 covers the air inlet 32 so as to prevent foreign matters from entering the air channel 31 and damaging the fan 10. The shield 70 also can prevent a hand from entering the air channel 31 unexpectedly. Generally, the shield 70 is protruded toward a direction that is departed from the air inlet 32. Referring to FIG. 1-2, the shield 70 is protruded toward the inside of the air intake space 80. The air channel portion 30 includes an air duct 34. The air channel 31 is formed by the inner wall of the air duct 34. The air inlet 32 and the air outlet 33 are formed on two ends of the air duct 34 respectively. The shield 70 is formed on the end of the air duct 34 where the air inlet 32 is located.

In an axial direction of the central axis 101, a distance L1 from the coupling portion 40 to the air inlet 32 is greater than or equal to 120 mm and less than or equal to 150 mm. If the distance L1 is too large, a size of the blower 100 in the axial direction of the central axis will become large, which makes the blower 100 be difficult to carry and use. If the distance L1 is too small, the air intake efficiency is affected. The arrangement of the distance L1 is selected to ensure that the blower 100 not too long and to ensure that the blower 100 has a higher efficiency.

For different blowers 100, the fan 10 and the air channel 31 have different diameters. The diameters can affect the efficiency of the blower 100. The air channel 31 has its maximum size L2 at the fan 10 in the radial direction of the central axis 101. The size L2 can be considered as an inner diameter of the air channel 31 at the fan 10. A ratio between the distance L1 and the size L2 is greater than or equal to 1 and less than or equal to 3. This arrangement can ensure that the blower 100 is not too long and has enough air intake. Specifically, the revolving speed of the fan 10 is greater than or equal to 20000 rpm and less than or equal to 30000 rpm. Further, the revolving speed of the fan 10 is greater than or equal to 20000 rpm and less than or equal to 25000 rpm. The fan 10 is an axial fan. The maximum wind of the air outlet 33 is greater than or equal to 12N and less than or equal to 25N. The maximum air speed of the air outlet 33 is greater than or equal to 45 m/s and less than or equal to 70 m/s.

A ratio between the distance L1 and a size L3 of a whole constituted by the battery pack 60 and the blower 100 in the direction of the central axis 101 when the battery pack 60 is coupled with the coupling portion 40 is greater than or equal to 10% and less than or equal to 16%. That is, 10%≤L1/L3≤16%. This arrangement can ensure the blower 100 has a reasonable length which is easy for the user to operate and ensure enough air intake.

Figure 3:
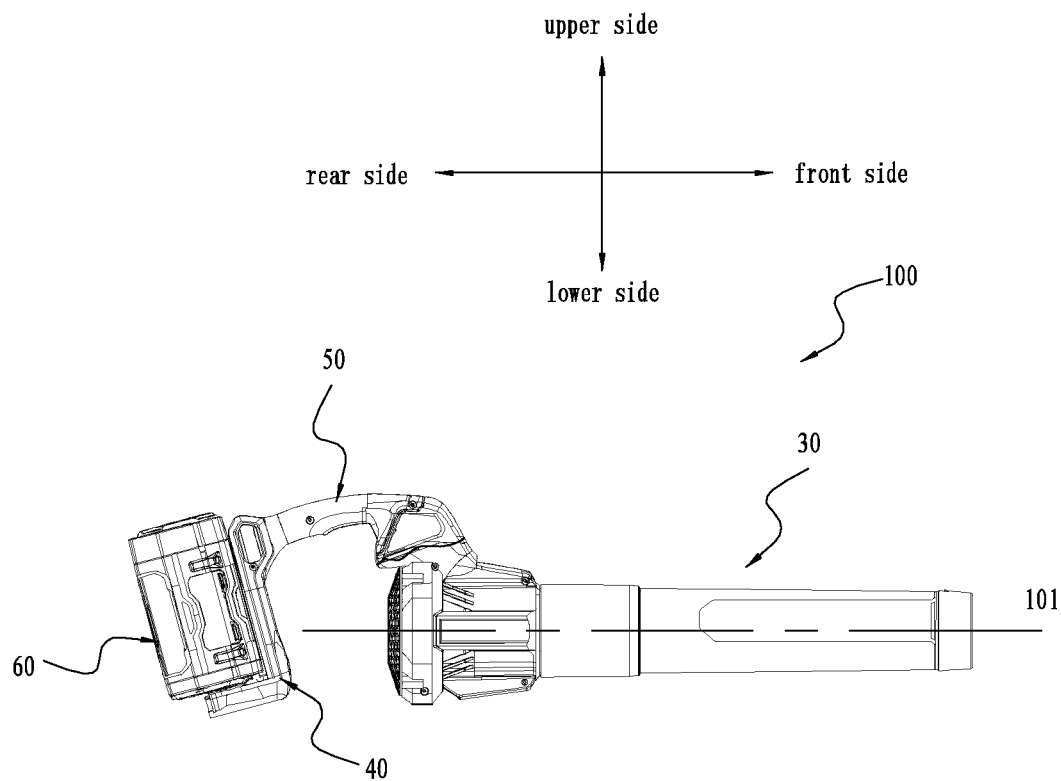
FIG. 3 is a plane view of the blower in FIG. 1.
Figure 4:
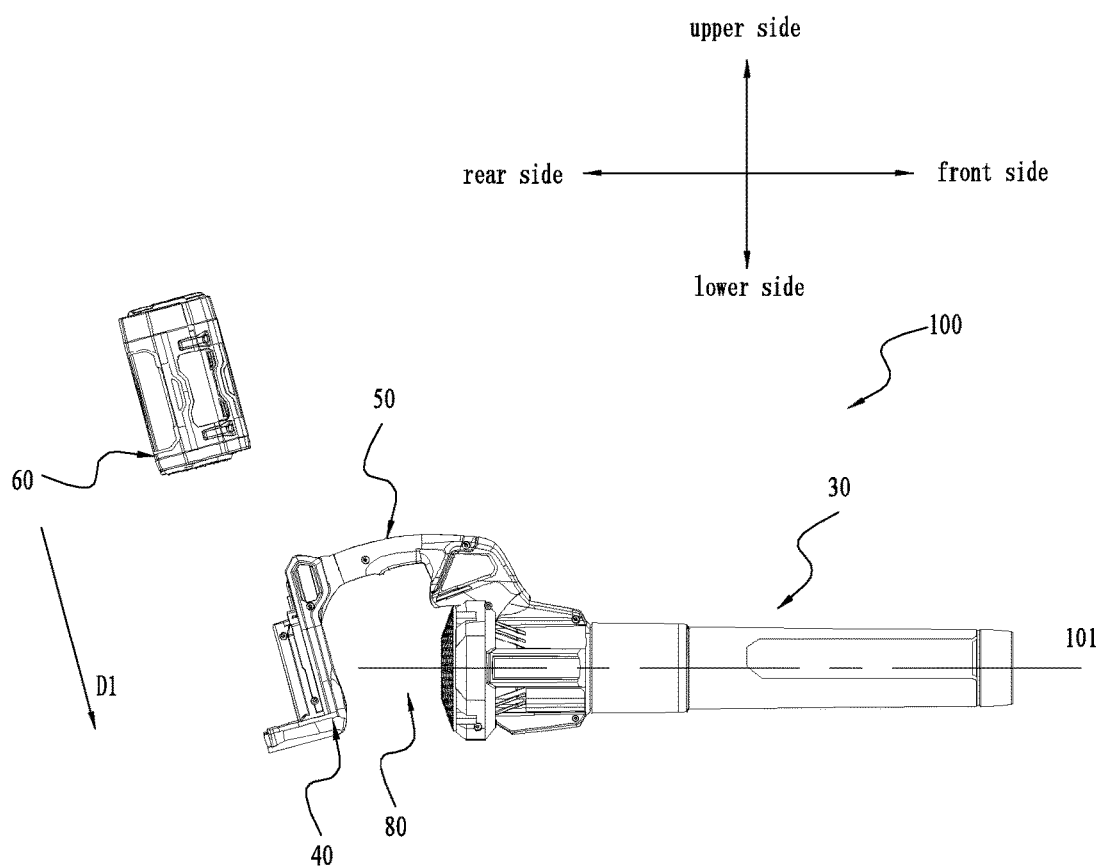
FIG. 4 is a schematic view showing the mounting of a battery pack in FIG. 1.

Referring to FIGS. 3-4, the battery pack 60 is coupled detachably with the coupling portion 40 in a sliding mode. The battery pack 60 is coupled with the coupling portion 40 along a direction D1 which is obliquely intersected with the central axis 101. The direction D1 is also obliquely intersected with a plane substantially perpendicular to the central axis 101. The direction D1 is not parallel to the central axis 101 and not perpendicular to the central axis 101.

When the battery pack 60 is coupled with the coupling portion 40, a segment of the battery pack 60 close to the handle 50 in the radial direction of the central axis 101 is defined as an upper end 61, and another segment of the battery pack 60 far from to the handle 50 is defined as a lower end 62.

In the axial direction of the central axis 101, a distance L4 from the upper end 61 to the air inlet 32 is greater than a distance L5 from the lower end 62 to the air inlet 32.

A side of the air outlet 33 is defined as a front direction, and a side of the air inlet 32 is defined as a rear direction. A side of the handle 50 is defined as an upper direction. The coupling portion 40 is located in the rear of the air inlet 32. The air outlet 33 is located in the front of the air inlet 32. The battery pack 60 can be inserted in the coupling portion 40 along a rear and upper direction and slide from the rear and upper direction to the front and lower direction so as to couple with the coupling portion 40. The oblique mounting method of the battery pack 60 makes mounting and detaching the battery pack 60 more convenient for the user.

Figure 5:
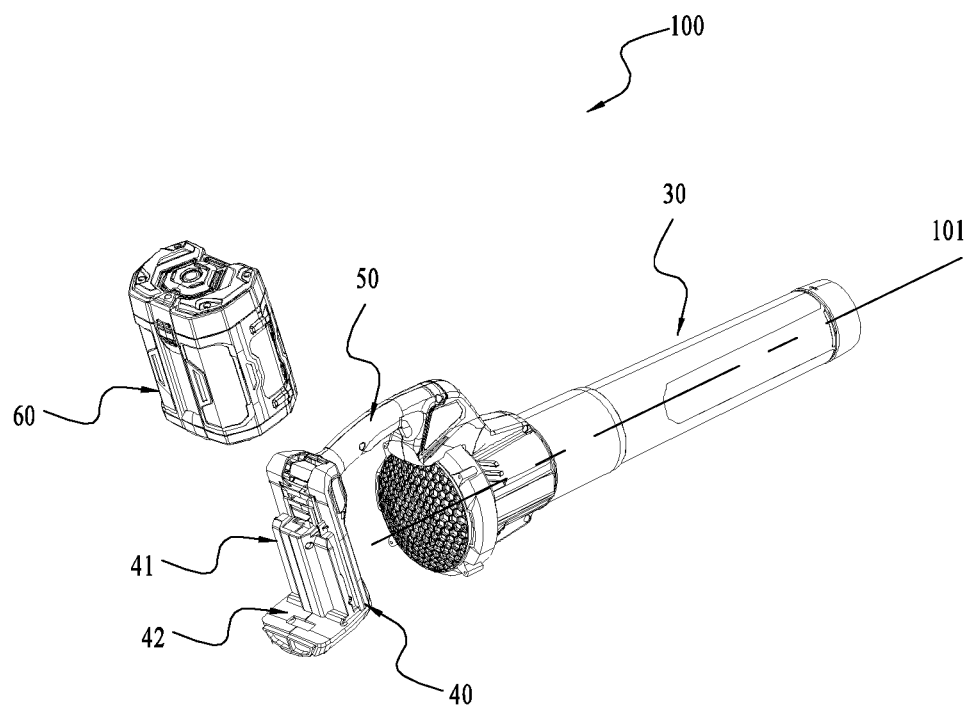
FIG. 5 is a schematic view of a coupling portion of the blower in FIG. 1.

As shown in FIG. 5, the coupling portion 40 is provided with a sliding surface 41 and a limiting surface 42. The sliding surface 41 can guide the battery pack 60 to slide relative to the coupling portion 40. The limiting surface 42 can limit the position of the battery pack 60 relative to the coupling portion 40. The sliding surface 41 is obliquely intersected with the central axis 101, and the limiting surface 42 is substantially perpendicular to the sliding surface 41.

As shown in FIG. 3, when the battery pack 60 is coupled with the coupling portion 40, a center of gravity of the whole constituted by the battery pack 60 and the blower 100 is in the air intake space 80. A projection of the center of the gravity of the whole on the central axis 101 is in a range of the projection of the handle 50 on the central axis 101, which is easy for the user to grip and operate.

Figure 6:
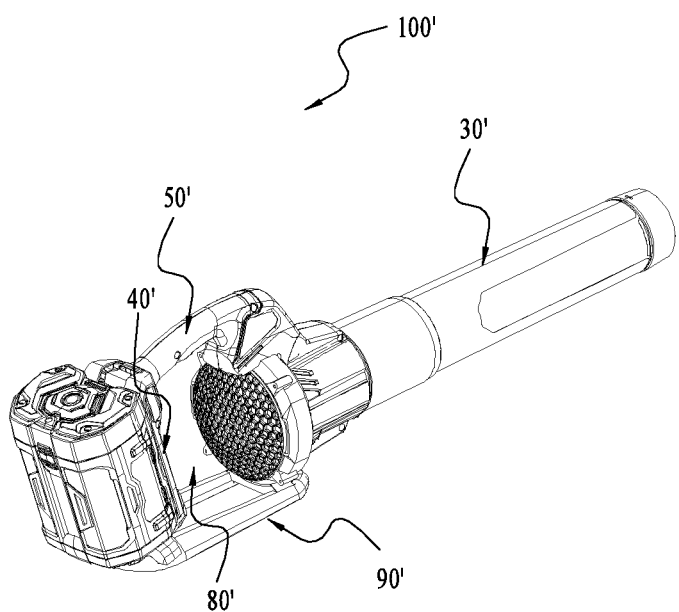
FIG. 6 is a section view of another example of the blower in FIG. 1.
Figure 7:
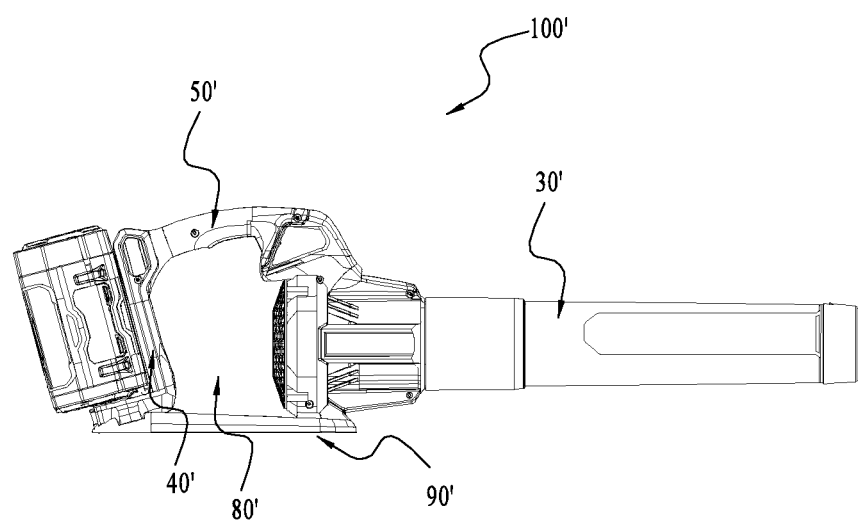
FIG. 7 is a plane view of the blower in FIG. 6.

Referring to FIGS. 6-7, in another example, a blower 100' is provided with a supporting seat 90' based on the blower 100, so that the blower 100' can be placed on the ground steadily and stored conveniently. The blower 100' is formed with an air intake space 80'. A coupling portion 40' and an air channel portion 30' are connected with each other through the supporting seat 90'. Specifically, the supporting seat 90' connects the coupling portion 40' and the air channel portion 30' on a side far from a handle 50'. The handle 50' and the supporting seat 90' are connected with two ends of the coupling portion 40' respectively. The handle 50' and the supporting seat 90' are also connected with two ends of the air channel portion 30' respectively.

Figure 8:
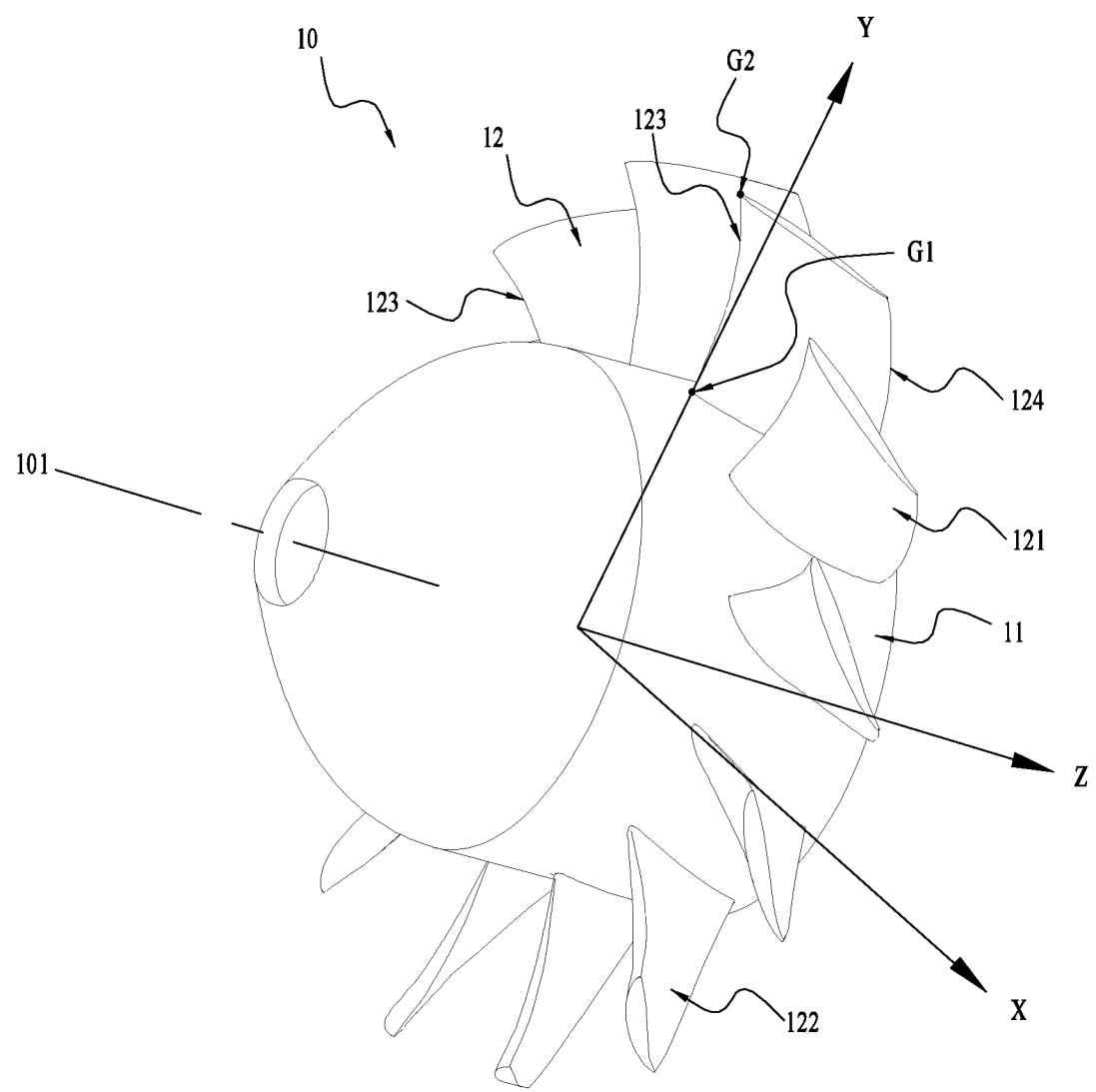
FIG. 8 is a schematic view of a fan of the blower in FIG. 1.

As shown in FIG. 8, the fan 10 includes a center hub 11 and several blades 12. The center hub 11 can be rotated about the central axis 101, which is connected with a motor shaft.

The blades 12 are extended from the center hub 11 outwards in the radial direction. The several blades 12 are arranged around the center hub 11. Specifically, the blades 12 and the center hub 11 are integrated as an element.

The blade 12 includes a pressure surface 122 and a suction surface 121. The pressure surface 122 and the suction surface 121 make the blade 12 have a wing shape.

The opposite two ends of the suction surface 121 and the pressure surface 122 intersect to form a front edge 123 and a rear edge 124. The front edge 123 is located in the front of the rear edge 124 in a rotation direction of the fan 10.

The front edge 123 has a point close to the center hub 11 which is defined as a root point G1. The front edge 123 has another point far from the center hub 11 which is defined as a tip point G2.

A line passing the root point G1 and substantially perpendicular to and intersecting with the central axis 101 is defined as an axis Y. The central axis 101 is defined as an axis Z. A line which is substantially perpendicular to the axis Y and the axis Z is the axis X.

Figure 9:
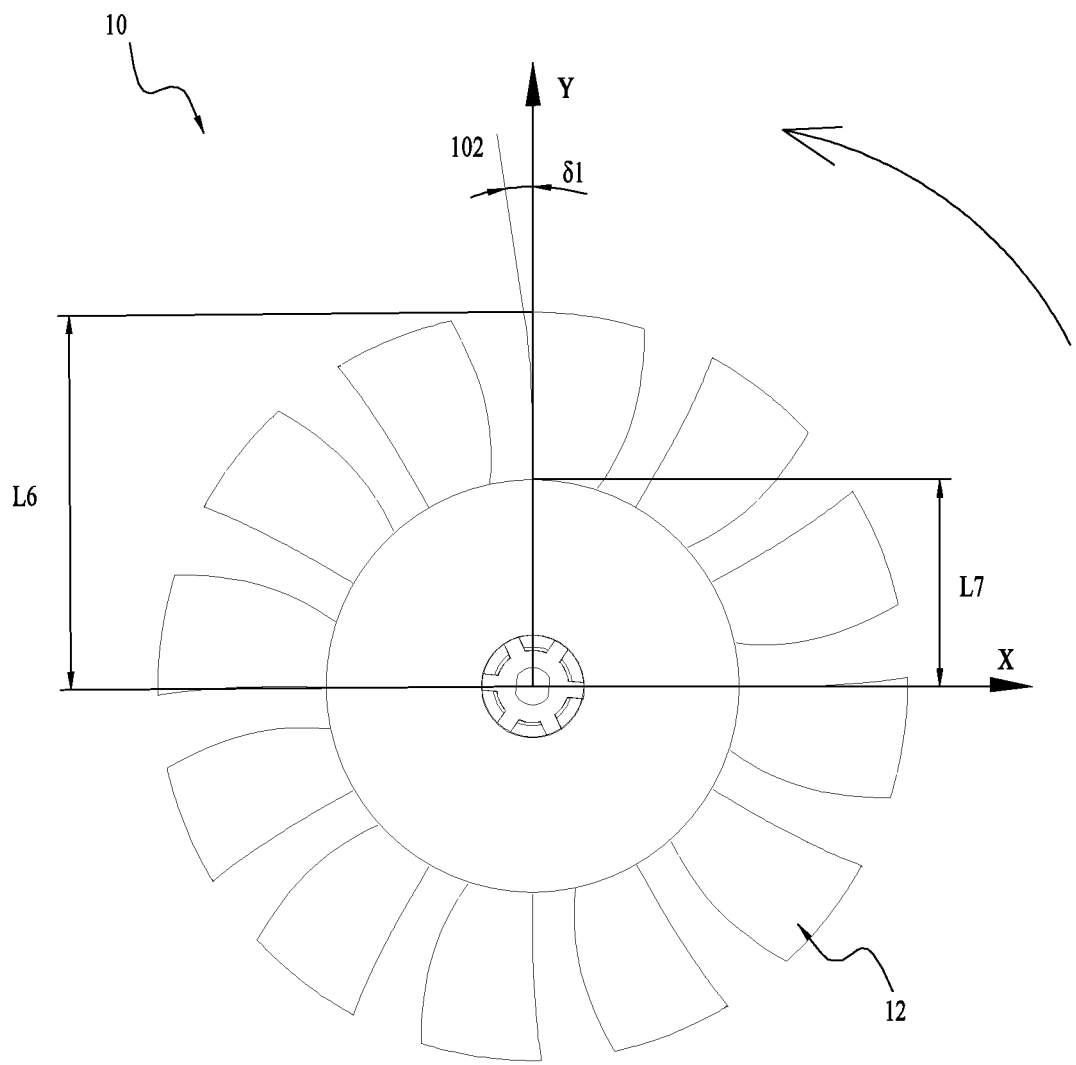
FIG. 9 is a plane view of the fan in FIG. 8.

As shown in FIG. 9, a projection of the front edge 123 in a plane constituted by the axis Y and the axis X is extended outwards in the radial direction of the central axis 101 and extended frontward in the rotation direction of the fan 10. A plane shown in FIG. 9 is the plane constituted by the axis Y and the axis X. An arrow shown in FIG. 9 is the rotation direction of the fan 10.

An angle $\delta 1$ between a tangent line 102 at the tip point G2 of the projection of the front edge 123 in the plane constituted by the axis Y and the axis X and the axis Y is greater than or equal to 5° and less than or equal to 15°. That is, an angle $\delta 1$ between the tangent line 102 and the axis Y is greater than or equal to 5° and less than or equal to 15°.

Figure 10:
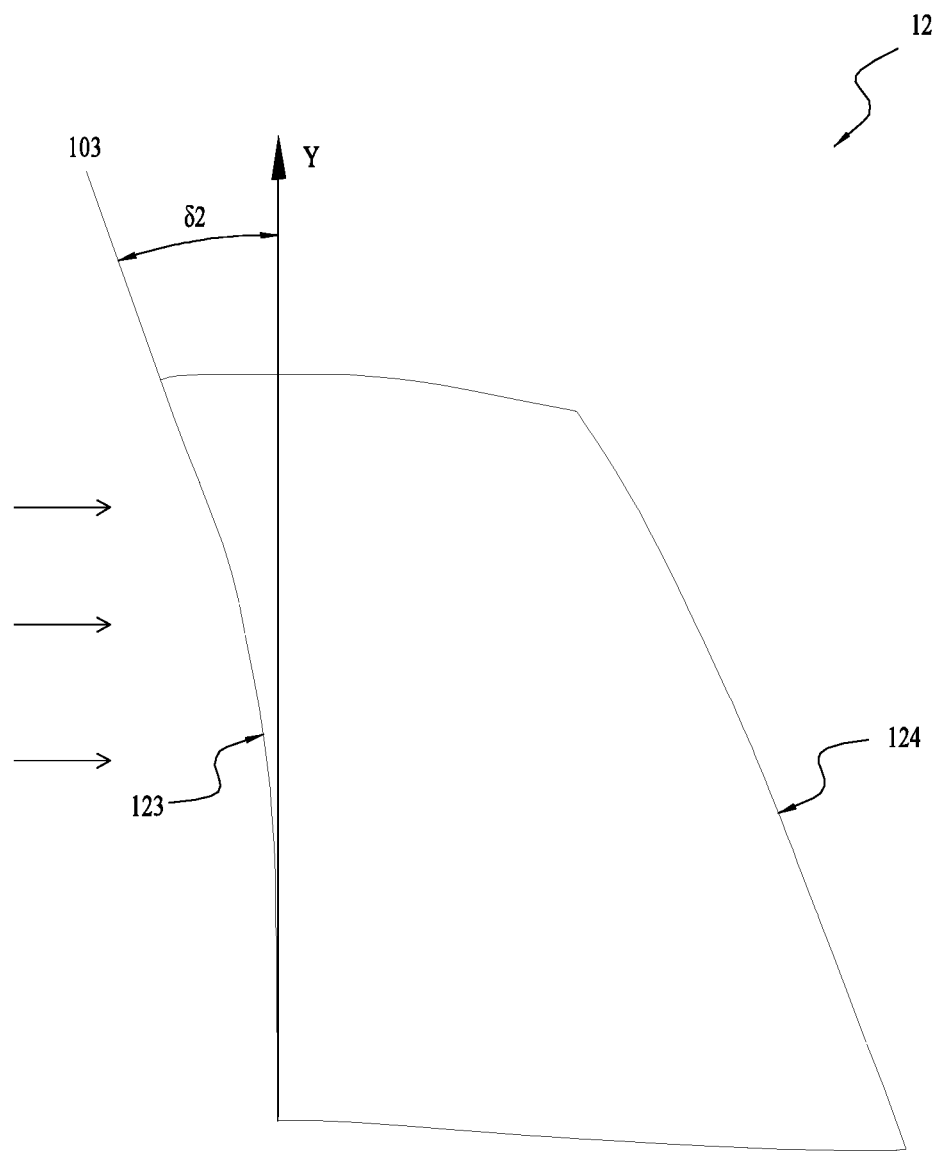
FIG. 10 is a schematic view of a projection of blades of the fan in a plane constituted by an axis Z and an axis Y in FIG. 8.
Figure 11:
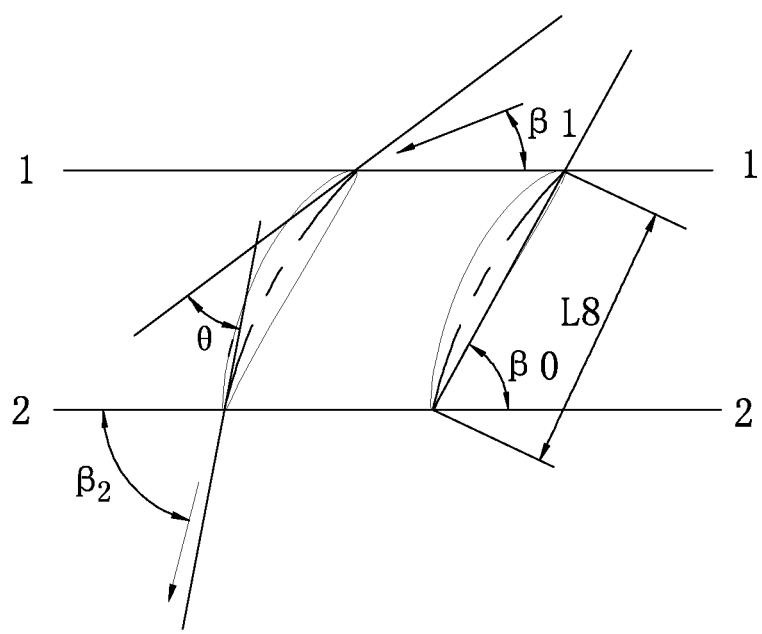
FIG. 11 is a schematic view of a mounting angle and a bent angle of the fan in FIG. 8.

As shown in FIG. 10, a projection of the front edge 123 in a plane constituted by the axis Z and the axis Y is extended outward in the radial direction and extended toward the air intake side of the fan 10. A plane shown in FIG. 10 is the plane constituted by the axis Z and the axis Y. An arrow shown in FIG. 10 is a flowing direction of the airflow. The left side is the air intake side, and the right side is the air outtake side. The air can flow from the air intake side to the air outtake side.

An angle $\delta 2$ between a tangent line 103 at the tip point G2 of the projection of the front edge 123 in the plane constituted by the axis Z and the axis Y and the axis Y is greater than or equal to 15° and less than or equal to 25°. That is, an angle $\delta 2$ between the tangent line 103 and the axis Y is greater than or equal to 15° and less than or equal to 25°.

Specifically, the angle $\delta 1$ between the tangent line 102 and the axis Y is greater than or equal to 6° and less than or equal to 10°, and the angle $\delta 2$ between the tangent line 103 and the axis Y is greater than or equal to 20° and less than or equal to 22°.

For the angle $\delta 1$, referring to the following Table 1, when the angle $\delta 1$ is increased, the air volume generated by the fan 10 is decreased gradually and the power consumption is reduced gradually.

TABLE 1

| Parameter | Air volume increase | Power consumption increase |
|---|---|---|
| Angle$\delta 1$ increases 5% | −0.92% | −2.80% |
| Angle$\delta 1$ increases 10% | −2.40% | −6.50% |
| Angle$\delta 1$ increases 15% | −3.92% | −10.35% |

For the angle $\delta 2$, referring to the following Table 2, when the angle $\delta 2$ is increased, the air volume generated by the fan 10 is increased gradually and the power consumption is increased gradually.

TABLE 2

| Parameter | Air volume increase | Power consumption increase |
|---|---|---|
| Angle$\delta 2$ increases 5% | 2.18% | 6.05% |
| Angle$\delta 2$ increases 10% | 3.20% | 8.32% |
| Angle$\delta 2$ increases 15% | 5.07% | 11.67% |

The angles $\delta 1$, $\delta 2$ can be designed reasonably so as to increase the air volume and maintain a lower power consumption at the same time.

More specifically, the blade 12 has a bent angle $\theta$ on the root which is greater than or equal to 5° and less than or equal to 35°, and the blade 12 has a mounting angle $\beta 0$ on the root which is greater than or equal to 30° and less than or equal to 60°.

TABLE 3

| Parameter | Air volume increase | Power consumption increase |
|---|---|---|
| 1.5 times of the mounting angle$\beta 0$ | 20.66% | 42.07% |
| 1.4 times of the mounting angle$\beta 0$ | 18.65% | 35.03% |
| 1.3 times of the mounting angle$\beta 0$ | 16.84% | 28.86% |
| 1.2 times of the mounting angle$\beta 0$ | 14.86% | 22.74% |
| 1.1 times of the mounting angle$\beta 0$ | 13.93% | 20.13% |

The increase of the mounting angle $\beta 0$ can cause the air volume to increase, and cause the power consumption to increase at the same time as shown in Table 3. The choices of the bent angle $\theta$ and the mounting angle $\beta 0$ need to consider the air volume and the power consumption. The arrangement of the bent angle $\theta$ and the mounting angle $\beta 0$ makes the fan 10 have increased air volume while having lower power consumption.

A distance from the tip of the blade 12 to the central axis 101 is a radius L6 of the tip. A distance from the root of the blade 12 to the central axis 101 is a radius L7 of the root. A ratio between the radius L6 of the tip and the radius L7 of the root is greater than or equal to 0.5 and less than or equal to 0.6. Specifically, the radius L6 of the tip is greater than or equal to 40 mm and less than or equal to 55 mm. Further, the radius L6 of the tip is greater than or equal to 45 mm and less than or equal to 49 mm.

The blade 12 has a chord length L8 at the root which is greater than or equal to 18 mm and less than or equal to 21 mm.

The blade 12 has an air intake angle $\beta 1$ of the front edge at the root which is greater than or equal to 25° and less than or equal to 45°. The blade 12 has an air outtake angle $\beta 2$ of the rear edge at the root which is greater than or equal to 40° and less than or equal to 85°.

The above illustrates and describes basic principles, main features and advantages of the present invention. Those skilled in the art should appreciate that the above embodi-

What is claimed is:

1. A blower, comprising:
an axial fan for generating airflow;
wherein the axial fan comprises:
a center hub capable of rotating around a central axis; and
a plurality of blades that extend outward from the center hub in a radial direction and that are arranged around the central axis;
wherein the plurality of blades and the center hub are integrated as a whole, each of the plurality of blades is provided with a suction surface and a pressure surface for generating airflow, two opposite ends of the suction surface and a pressure surface are intersected to form a front edge and a rear edge, and the front edge is in the front of the rear edge in a rotation direction of the axial fan, the front edge has a point close to the center hub which is defined as a root point, the front edge has another point far from to the center hub which is defined as a tip point, a line passing the root point and intersecting vertically with the central axis is defined as an axis Y, the central axis is defined as an axis Z, a line intersecting vertically with the axis Y and the axis Z is defined as an axis X, a projection of the front edge in a plane constituted by the axis X and the axis Y is extended outward in a radial direction of the central axis and extended forward in the rotation direction of the axial fan, a projection of the front edge in a plane constituted by the axis Z and the axis Y is extended outward in a radial direction of the central axis and extended toward a side of the axial fan from which the air is entered, an angle between a tangent line of a projection of the front edge in the plane constituted by the axis X and the axis Y at the tip point and the axis Y is greater than or equal to 5° and less than or equal to 15°, and an angle between a tangent line of a projection of the front edge in the plane constituted by the axis Z and the axis Y at the tip point and the axis Y is greater than or equal to 15° and less than or equal to 25°.

2. The blower of claim 1, wherein the angle between the tangent line of the projection of the front edge in the plane constituted by the axis X and the axis Y at the tip point and the axis Y is greater than or equal to 6° and less than or equal to 10° and the angle between the tangent line of the projection of the front edge in the plane constituted by the axis Z and the axis Y at the tip point and the axis Y is greater than or equal to 20° and less than or equal to 22°.

3. The blower of claim 1, wherein each of the plurality of blades has a mounting angle at the root which is greater than or equal to 30° and less than or equal to 60°.

4. The blower of claim 1, wherein the blade has a bent angle at the root which is greater than or equal to 5° and less than or equal to 35°.

5. The blower of claim 1, wherein a distance from the tip of each of the plurality of blades to the central axis is a radius of the tip, a distance from the root of each of the plurality of blades to the central axis is a radius of the root, and a ratio between the radius of the root and the radius of the tip is greater than or equal to 0.5 and less than or equal to 0.6.

6. The blower of claim 5, wherein the radius of the tip is greater than or equal to 40 mm and less than or equal to 55 mm.

7. The blower of claim 1, wherein each of the plurality of blades has a chord length at the root which is greater than or equal to 18 mm and less than or equal to 21 mm.

8. The blower of claim 1, wherein each of the plurality of blades has an air intake angle of the front edge at the root which is greater than or equal to 25° and less than or equal to 45°, and the blade has an air outtake angle of the rear edge at the root which is greater than or equal to 40° and less than or equal to 85°.

9. The blower of claim 1, wherein the axial fan has a revolving speed which is greater than or equal to 20000 rpm and less than or equal to 25000 rpm.

10. The blower of claim 1, further comprising:
a motor for driving the axial fan to rotate;
an air channel portion being formed with an air channel for guiding the airflow generated by the axial fan, the air channel being extended along the central axis;
a coupling portion for coupling with a battery pack, the battery pack being used to supply power to the motor; and
a handle connected with the air channel portion and the coupling portion respectively;
wherein the axial fan is located in the air channel, the air channel is formed with an air inlet and an air outlet at its two ends, the air inlet is located between the air outlet and the coupling portion, and the coupling portion, the air channel portion and the handle constitute an air intake space which is open in the radius direction of the central axis.

11. The blower of claim 10, wherein the handle is located outside the air inlet in the radial direction of the central axis.

12. The blower of claim 10, wherein a distance from the coupling portion to the air inlet in an axial direction of the central axis is greater than or equal to 120 mm and less than or equal to 150 mm.

13. The blower of claim 10, wherein a ratio between the distance from the coupling portion to the air inlet in the axial direction of the central axis and a maximum size of the air channel at the axial fan in the radial direction of the central axis is greater than or equal to 1 and less than or equal to 3.

14. The blower of claim 10, wherein a ratio between the distance from the coupling portion to the air inlet in the axial direction of the central axis and a size of a whole constituted by the battery pack and the blower in the axial direction of the central axis when the battery pack is coupled with the blower is greater than or equal to 10% and less than or equal to 16%.

15. The blower of claim 10, wherein the battery pack is coupled with the coupling portion along a coupling direction which is obliquely intersected with the central axis.

16. The blower of claim 11, wherein when the battery pack is coupled with the coupling portion, the battery pack has an end close to the handle in the radial direction of the central axis which is defined as an upper end, the battery pack has the other end far from the handle which is defined as a lower end, and a distance from the upper end to the air inlet is greater than a distance from the lower end to the air inlet.

17. The blower of claim 10, wherein a side of the air outlet is defined as a front direction, a side of the air inlet is defined as a rear direction, a side of the handle is defined as an upper direction, and the battery pack is coupled with the coupling direction from the rear and upper direction to the front and lower direction.

18. The blower of claim 10, wherein the coupling portion is formed with a sliding surface for guiding the battery pack to slide relative to the coupling portion and the sliding surface is obliquely intersected with the central axis.

19. The blower of claim 18, wherein the coupling portion is formed with a limiting surface for limiting the position of the battery pack relative to the coupling portion and the limiting surface is substantially perpendicular to the sliding surface.

20. The blower of claim 10, wherein when the battery pack is coupled with the coupling portion and a whole constituted by the battery pack and the blower has a center of gravity which is located in the air intake space.

* * * * *